(12) United States Patent
Otaka

(10) Patent No.: US 11,368,210 B2
(45) Date of Patent: Jun. 21, 2022

(54) RELAY DEVICE, PROGRAM, COMMUNICATION SYSTEM, AND COMMUNICATION METHOD

(71) Applicant: Honda Motor Co., Ltd., Tokyo (JP)

(72) Inventor: Masaru Otaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/173,962

(22) Filed: Feb. 11, 2021

(65) Prior Publication Data

US 2021/0167846 A1 Jun. 3, 2021

Related U.S. Application Data

(63) Continuation of application No. PCT/JP2019/014243, filed on Mar. 29, 2019.

(51) Int. Cl.
| | |
|---|---|
| *H04B 7/14* | (2006.01) |
| *H04B 7/155* | (2006.01) |
| *H04W 36/00* | (2009.01) |
| *H04W 36/30* | (2009.01) |
| *H04W 88/04* | (2009.01) |

(52) U.S. Cl.
CPC .. *H04B 7/15557* (2013.01); *H04W 36/00837* (2018.08); *H04W 36/30* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2011/0021221 A1 | 1/2011 | Kondo | |
| 2011/0256826 A1 | 10/2011 | Ode et al. | |
| 2015/0043422 A1 | 2/2015 | Fujishiro et al. | |
| 2017/0098964 A1* | 4/2017 | Sakata | H02J 50/50 |

FOREIGN PATENT DOCUMENTS

| | | |
|---|---|---|
| CN | 102273246 A | 12/2011 |
| EP | 2393316 A | 12/2011 |
| EP | 2830344 A1 | 1/2015 |
| JP | 2004320370 A | 11/2004 |

(Continued)

OTHER PUBLICATIONS

International Search Report of related international application PCT/JP2019/014243, dated Apr. 23, 2019.

(Continued)

*Primary Examiner* — Suhail Khan
(74) *Attorney, Agent, or Firm* — Mark Duell; American Honda Motor Co., Inc.

(57) ABSTRACT

There is provided a relay device for relaying communication between a radio base station and a communication terminal, the relay device including a relay function management switch that switches on and off a relay function for relaying communication between a radio base station and a communication terminal of a relay means; and a change command transmitter that transmits, to the communication terminal, a change command of a handover threshold for the communication terminal establishing a wireless communication connection with the relay device when the relay function management switch switches the relay function off.

23 Claims, 6 Drawing Sheets

(56) References Cited

FOREIGN PATENT DOCUMENTS

| | | |
|---|---|---|
| JP | 2011029988 A | 2/2011 |
| JP | 2011135439 A | 7/2011 |
| JP | 2014003696 A | 1/2014 |
| JP | 2016076960 A | 5/2016 |
| KR | 20110102421 A | 9/2011 |
| WO | WO2010086979 A1 | 8/2010 |
| WO | WO2013141321 A1 | 9/2013 |

OTHER PUBLICATIONS

English Translation of International Search Report of related international application PCT/JP2019/014243, dated Apr. 23, 2019.
Written Opinion of the International Searching Authority of related international application PCT/JP2019/014243, dated Apr. 23, 2019.

* cited by examiner

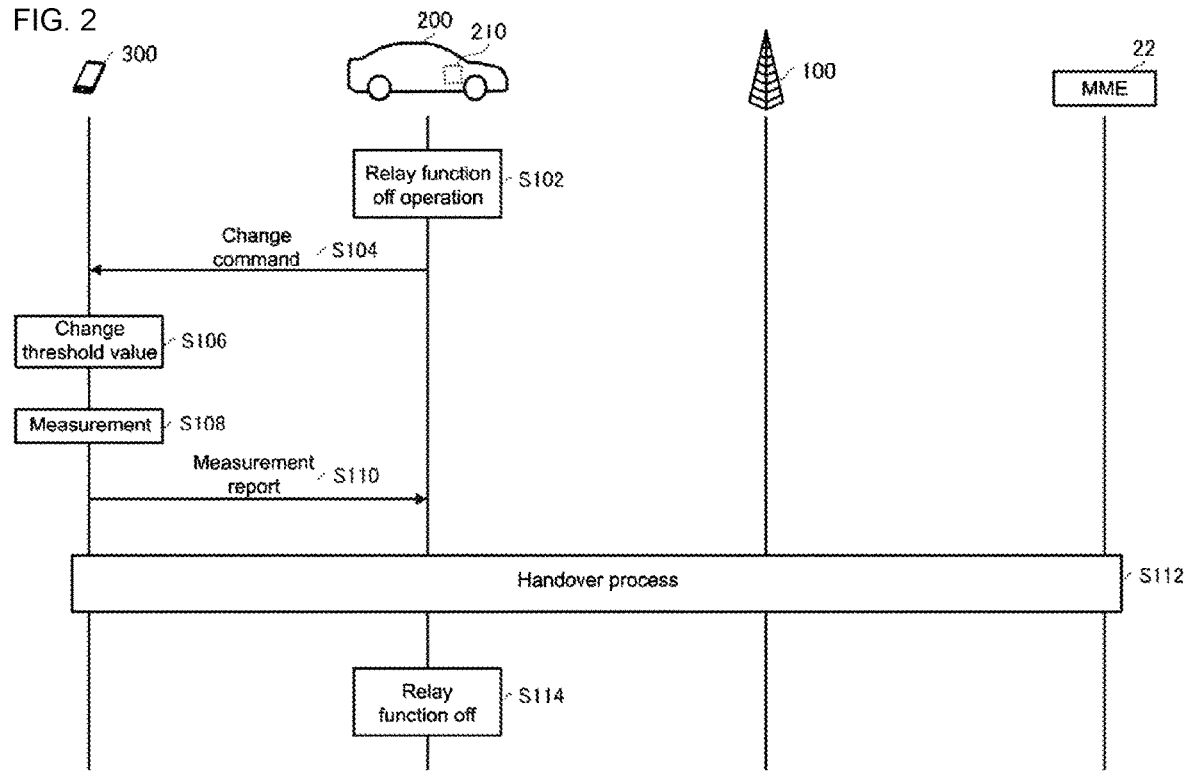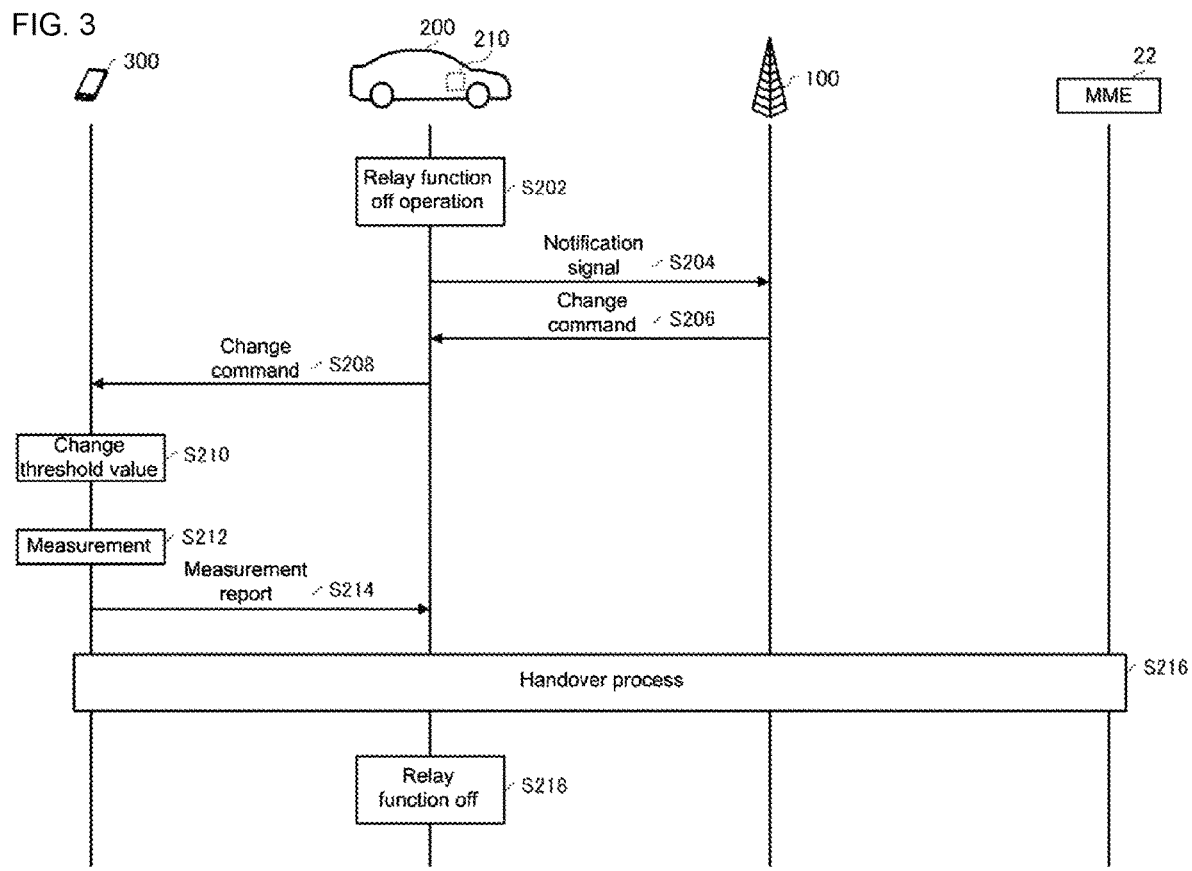

RELAY DEVICE, PROGRAM, COMMUNICATION SYSTEM, AND COMMUNICATION METHOD

RELATED APPLICATIONS

This application is a continuation application of International Patent Application No. PCT/JP2019/014243, the disclosure of which is incorporated by reference herein in its entirety.

TECHNICAL FIELD

The embodiments presented relate to a relay device, a program, a communication system, and a communication method.

BACKGROUND

A movable relay device that functions as a base station is known. It is desirable to provide operations for a moveable relay device that functions as a base station.

SUMMARY

According to one aspect, a relay device for relaying communication between a radio base station and a communication terminal is provided. The relay device may include a relay function management switch that switches on and off a relay function for relaying communication between the radio base station and the communication terminal, and a change command transmitter that transmits, to the communication terminal, a change command of a handover threshold for the communication terminal establishing a wireless communication connection with the relay device when the relay function management switch switches the relay function off.

According to another aspect, a non-transitory machine-readable storage medium including instructions, which when implemented by one or more machines, causes the one or more machines to perform operations is provided. These operations may include switching on and off a relay function for relaying communication between a radio base station and a communication terminal, and transmitting, to the communication terminal, a change command of a handover threshold for the communication terminal establishing a wireless communication connection with a relay device when a relay function management switch switches the relay function off.

According to yet another aspect, a communication system including a relay device for relaying communication between a radio base station and a communication terminal is provided. The communication system may include a relay function management switch that switches on and off a relay function for relaying communication between the radio base station and the communication terminal of the relay device, and a change command transmitter that transmits, to the communication terminal, a change command of a handover threshold for the communication terminal establishing a wireless communication connection with the relay device when the relay function management switch switches the relay function off.

According to still yet another aspect, a communication method is provided. The method may include a change command transmitting stage of transmitting, to a communication terminal, a change command of a handover threshold for the communication terminal establishing a wireless communication connection with a relay device when switching from on to off the relay function of the relay device for relaying communication between the radio base station and the communication terminal.

According to another aspect, a relay device for relaying communication between a radio base station and a communication terminal is provided. The relay device may include a relay function management switch that switches on and off the relay function for relaying communication between the radio base station and the communication terminal. The relay device may include a change command transmitter configured to transmit, to the communication terminal, a change command of a handover threshold for a communication terminal establishing a wireless communication connection with the relay device when the relay function management switch switches the relay function off.

The change command of the handover threshold may be a command for changing a handover threshold for a radio frequency band used in the wireless communication with the communication terminal. The relay device described above may include a specifying unit configured to specify a radio frequency band used for wireless communication with the communication terminal, and the change command transmitter may transmit, to the communication terminal, a change command of a handover threshold for the radio frequency band specified by the specifying unit. When the relay function management switch switches the relay function off, the change command transmitter may transmit to the radio base station a notification signal notifying to switch the relay function off, receive the change command transmitted by the radio base station, and transmit the change command to the communication terminal. The relay device may include a change command generating unit that generates the change command when the relay function management switch switches the relay function off, and the change command transmitter may transmit, to the communication terminal, the change command generated by the change command generating unit. The change command transmitter may transmit, to the communication terminal, the change command for increasing the handover threshold for determining whether the radio wave reception intensity from a serving cell is lower than the handover threshold. The change command transmitter may transmit, to the communication terminal, the change command for increasing the handover threshold to a predetermined value. The change command transmitter may transmit, to the communication terminal, the change command for increasing the handover threshold by a predetermined value. The change command transmitter may transmit the change command to the communication terminal before the relay function management switch switches the relay function off. The relay function management switch may switch the relay function off after the change command transmitter transmits the change command to the communication terminal, and the communication terminal is handed over from the relay device. The relay function management switch may switch the relay function off after all of the communication terminals establishing a wireless communication connection with the relay device are handed over from the relay device.

The relay device may be mounted on a moving body. The relay device may include an estimation unit configured to monitor the state of the moving body while the relay function is switched on, and estimate that the relay function will be switched off, and the change command transmitter may transmit the change command to the communication terminal in response to the estimation unit estimating that the relay function will be switched off. When the moving speed of the moving body satisfies a predetermined condition, the estimation unit may estimate that the relay function will be switched off. When the moving speed of the moving body is slower than a predetermined speed, the estimation unit may estimate that the relay function will be switched off. When a power off operation of the moving body is detected, the estimation unit may estimate that the relay function will be switched off. The moving body may be a vehicle, and the estimation unit may estimate that the relay function will be switched off when an ignition off operation of the vehicle is detected.

According to still another aspect, a program for causing a computer to function as the relay device is provided.

According to yet another aspect, a communication system including a relay device for relaying communication between a radio base station and a communication terminal is provided. The communication system may include a relay function management switch that switches on and off the relay function for relaying communication between the radio base station and the communication terminal of the relay device. The communication system may include a change command transmitter configured to transmit, to the communication terminal, a change command of a handover threshold for a communication terminal establishing a wireless communication connection with the relay device when the relay function management switch switches the relay function off. The communication system may include a specifying unit configured to specify a radio frequency band used for wireless communication with the communication terminal by the relay device, and the change command transmitter may transmit, to the communication terminal, a change command of a handover threshold for the radio frequency band specified by the specifying unit.

According to yet still another aspect, a communication method is provided. The communication method may include a change command transmitting stage of transmitting, to a communication terminal, a change command of a handover threshold for a communication terminal establishing a wireless communication connection with the relay device when switching from on to off the relay function of the relay device for relaying communication between the radio base station and the communication terminal. The communication method may include a specifying stage of specifying a radio frequency band used for wireless communication with the communication terminal by the relay device, and the change command transmitting stage may include transmitting, to the communication terminal, a change command of a handover threshold for the radio frequency band specified in the specifying stage.

BRIEF DESCRIPTION OF THE DRAWINGS

FIG. 2 schematically illustrates an example of the flow of processes in the communication system 10 in accordance with one aspect of the present disclosure.

FIG. 3 schematically illustrates an example of the flow of processes in the communication system 10 in accordance with one aspect of the present disclosure.

DETAILED DESCRIPTION

Hereinafter, one or more embodiment may be described with reference to the accompanying drawings. However, the following embodiments are not intended to limit the scope of the claims. Furthermore, not all of the combinations of features described in the embodiments presented are or should be deemed essential. Moreover, subcombinations of groups of these features may be included.

Figure 1:
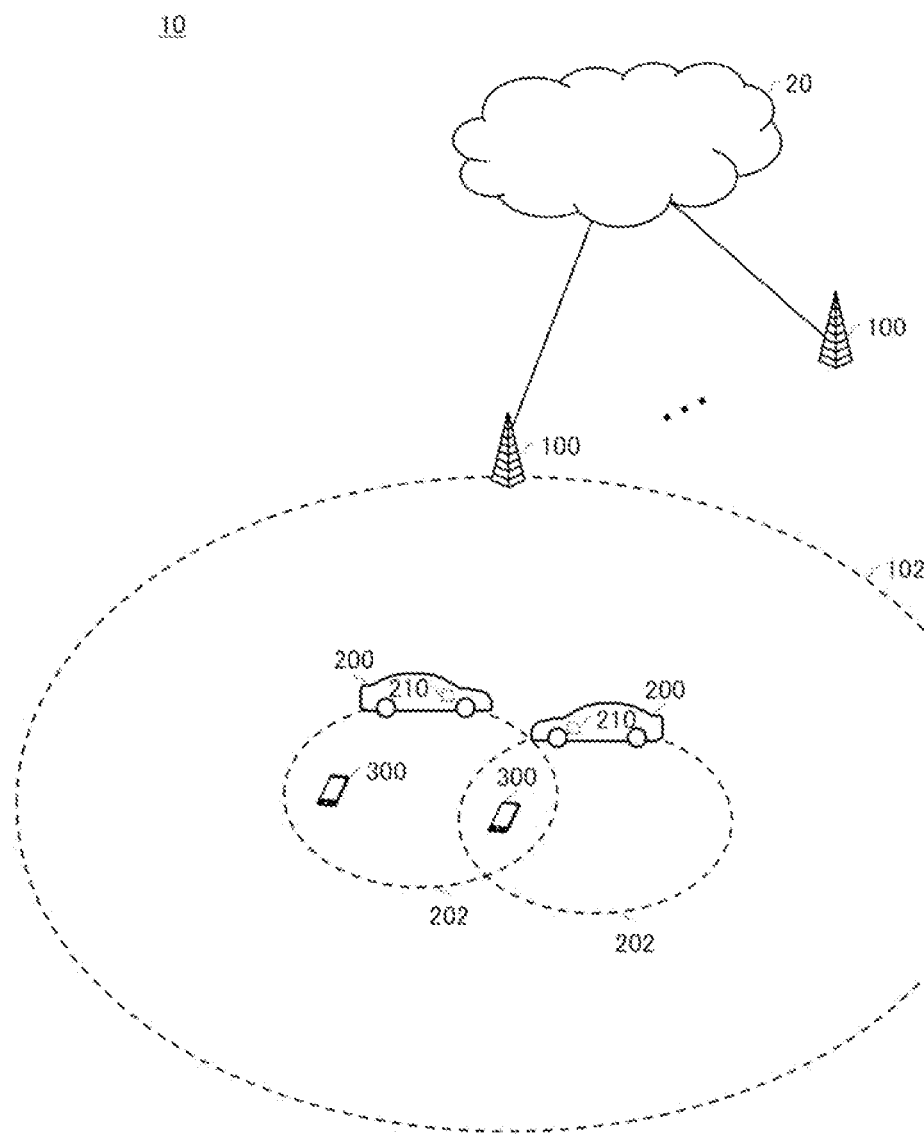
FIG. 1 schematically illustrates an example of a communication system 10 in accordance with one aspect of the present disclosure.

FIG. 1 schematically illustrates an example of a communication system 10. The communication system 10 includes a relay device 210 for relaying communication between a radio base station 100 and a communication terminal 300. The relay device 210 may be mounted to a moving body. In the present embodiment, a case in which the relay device 210 is mounted on a vehicle 200 will be described by way of an example. The vehicle 200 on which the relay device 210 is mounted may be referred to as a mobile base station. Other examples of the moving body include unmanned air vehicles such as drones. The communication system 10 may include the vehicle 200. The communication system 10 may include the radio base station 100. Note that the relay device 210 may not be mounted on the moving body and may be installed in a fixed manner.

The vehicle 200 may be an automobile. The vehicle 200 may be any type of vehicle as long as it has a wireless communication function. The vehicle 200 may be, for example, a gasoline vehicle, or may be a so-called eco-car. Types of eco-cars include HV (Hybrid Vehicle), PHEV/PHV (Plug-in Hybrid Vehicle), EV (Electric Vehicle), and FCV (Fuel Cell Vehicle). The vehicle 200 may be an automobile for any purpose. The vehicle 200 may be, for example, a personal car or may be a vehicle for business such as a taxi and a bus.

The radio base station 100 may comply with any mobile communication scheme. The radio base station 100 complies with, for example, the Third Generation (3G) communication scheme. The radio base station 100 complies with, for example, the Long Term Evolution (LTE) communication scheme. The radio base station 100 may be eNB (eNodeB). The radio base station 100 complies with, for example, the Fifth Generation (5G) communication scheme. The radio base station 100 may be gNB (gNodeB). The radio base station 100 may comply with mobile communication schemes including the Sixth Generation (6G) communication scheme and onward. Here, a case in which the radio base station 100 complies with the LTE communication scheme will be mainly described as an example.

The relay device 210, for example, is located in the wireless communication area 102 generated by the radio base station 100 and performs wireless communication with the radio base station 100. When the relay device 210 is located in the wireless communication area 102 generated by the radio base station 100, this may be that the relay device 210 is located in the wireless communication area 102 to establish a wireless communication connection with the radio base station 100.

The relay device 210, for example, generates the wireless communication area 202, and performs wireless communication with the communication terminal 300 located in the wireless communication area 202. When the communication terminal 300 is located in the wireless communication area 202, this may be that the communication terminal 300 is located in the wireless communication area 202 to establish a wireless communication connection with the vehicle 200. Note that when the communication terminal 300 is located in the wireless communication area 202 generated by the relay device 210, this may be described as the communication terminal 300 being located in the relay device 210.

The mobile communication scheme between the relay device 210 and the communication terminal 300 may be the same as the mobile communication scheme between the relay device 210 and the radio base station 100. Furthermore, the mobile communication scheme between the relay device 210 and the communication terminal 300 may be different from the mobile communication scheme between the relay device 210 and the radio base station 100.

The communication terminal 300 may be any communication terminal as long as it has a wireless communication function. The communication terminal 300 is, for example, a mobile phone such as a smartphone, a tablet terminal, a wearable terminal, a Personal Computer (PC), and the like. The communication terminal 300 may be an Internet of Things (IoT) terminal.

The relay device 210 according to the present embodiment is capable of switching on and off the relay function for relaying communication between the radio base station 100 and the communication terminal 300. For example, the relay device 210 switches on and off the relay function according to the operation of an occupant of the vehicle 200.

Furthermore, for example, the relay function of the relay device 210 is switched on or off according to the operating state of the vehicle 200. For example, when the vehicle 200 is a vehicle with an engine and has an off state, an accessory (sometimes referred to as ACC) power on state, an ignition (sometimes referred to as IG) power on state, and an engine off state, the relay function of the relay device 210 is switched on when the IG power supply is turned on, and the relay function of the relay device 210 is switched off when the IG power supply is switched off. Furthermore, for example, the relay function of the relay device 210 is switched on when the engine is turned on, and the relay function of the relay device 210 is switched off when the engine is switched off. The relay function of the relay device 210 may be switched on when the ACC power supply is turned on, and the relay function of the relay device 210 may be switched off when the ACC power supply is switched off.

Moreover, for example, when the vehicle 200 is an electric vehicle and has an off state, an ACC state in which some electrical components are available, an on state in which all the electrical components are available, and a travelable state, the relay function of the relay device 210 is switched on in the on state, and the relay function of the relay device 210 is switched off when switched from an on state to an ACC state or an off state. Furthermore, for example, the relay function of the relay device 210 is switched on in the travelable state, and the relay function of the relay device 210 is switched off when switched from the travelable state to the on state, the ACC state or the off state.

Moreover, for example, when the vehicle 200 is an electric vehicle and has an off state, a power on state, and a travelable state, the relay function of the relay device 210 is switched on in the power on state, and the relay function of the relay device 210 is switched off when switched from the power on state to the off state. Furthermore, for example, the relay function of the relay device 210 is switched on in the travelable state, and the relay function of the relay device 210 is switched off when switched from the travelable state to the power on state or the off state.

When the relay function of relay device 210 is switched off while the communication terminal 300 is located in the relay device 210, the wireless communication connection of the communication terminal 300 is disconnected. When a plurality of communication terminals 300 are located in the relay device 210, reconnection may frequently occur.

When switching the relay function off, the relay device 210 according to the present embodiment performs a process of guiding the communication terminal 300 located in the relay device 210 to be located in another relay device 210 or the radio base station 100 before switching the relay function off. When switching the relay function off, the relay device 210 transmits, to the communication terminal 300, a change command of a handover threshold for the communication terminal 300 located in the relay device 210. When switching the relay function off, the relay device 210 may transmit, to the communication terminal 300 located in the relay device 210, a change command of the handover threshold with respect to the radio frequency band used in the wireless communication with the communication terminal 300.

The relay device 210 transmits, to the communication terminal 300, for example, a change command for increasing the handover threshold for determining whether the radio wave reception intensity from the serving cell is lower than the handover threshold. As a specific example, the relay device 210 transmits, to the communication terminal 300, a change command for increasing the handover threshold in an event A2 of the LTE communication scheme. Moreover, for example, the relay device 210 transmits, to the communication terminal 300, a change command for increasing the handover threshold used for comparison with the radio wave reception intensity from the serving cell in an event A5.

The relay device 210, for example, transmits a change command for increasing the handover threshold to a predetermined value to the communication terminal 300. The predetermined value may be, for example, an unrealistically high value (e.g., infinity or equivalent thereof) that is not normally set. Moreover, for example, the relay device 210 transmits, to the communication terminal 300, a change command for increasing the handover threshold by a predetermined value. The predetermined value may be an unrealistically high value (e.g. infinite or equivalent thereof) by being added to a handover threshold that is set to a realistic value.

As described above, handover may be promoted to the communication terminal 300 located in the relay device 210 by changing the handover threshold of the communication terminal 300, and the communication terminal 300 may be handed over at an early stage from the relay device 210. The relay device 210 may switch the relay function off after the communication terminal 300 is handed over from the relay device 210. In this way, when relay device 210 switches the relay function off, the wireless communication connection of the communication terminal 300 located in the relay device 210 is disconnected, and the occurrence of a situation where reconnection frequently occurs may be suppressed.

FIG. 2 schematically illustrates an example of a flow of processes in the communication system 10. Here, a flow of processes when the relay device 210 switches the relay function off in a situation where the communication terminal 300 is located in the relay device 210 will be described.

In step 120 (step may be described as S in an abbreviated form), the relay device 210 accepts an off operation of the relay function by an occupant of the vehicle 200. In S104, the relay device 210 transmits a change command of the handover threshold to the communication terminal 300. The relay device 210 may transmit, to the communication terminal 300, a change command of the handover threshold by including it in a message (e.g., RRC Connection Reconfiguration).

In S106, the communication terminal 300 changes the handover threshold in accordance with the change command received in S104. In S108, the communication terminal 300 measures the radio wave reception intensity from the relay device 210. Here, the description will be continued assuming the measured radio wave reception intensity is lower than the handover threshold after the change in S106.

In S110, the communication terminal 300 transmits a measurement report to the relay device 210. The measurement report may be a so-called Measurement Report.

In S112, the handover process is executed to cause the communication terminal 300 to be handed over. The communication terminal 300, for example, is located in the radio base station 100 where the relay device 210 is located or a relay device 210 different from such relay device 210.

The method of the handover process may be any method. For example, the handover process is an X2 handover. In this case, the relay device 210 that has received the measurement report in S110 determines the handover destination of the communication terminal 300, transmits a handover request to the handover destination, and transmits a handover instruction to the communication terminal 300. The relay device 210 transmits the terminal information of the communication terminal 300 to the handover destination through the X2 interface, and a synchronization process is performed between the communication terminal 300 and the handover destination. Furthermore, a path switching request is transmitted from the handover destination to the Mobility Management Entity (MME) 22 in the core network 20, and the MME 22 notifies the core side of the handover destination. Then, the path is switched by the core side, and the handover is completed. Note that the handover process may be an S1 handover.

In S114, the relay device 210 switches the relay function off after the handover of the communication terminal 300 has been completed.

FIG. 3 schematically illustrates an example of a flow of processes in the communication system 10. Here, a point different from the flow of the processes illustrated in FIG. 2 will be mainly described.

In S202, the relay device 210 accepts an off operation of the relay function by an occupant of the vehicle 200. In S204, the relay device 210 transmits a notification signal notifying to switch the relay function off to the radio base station 100 in which the relay device 210 is located.

In S206, in response to receiving the notification signal in S204, the radio base station 100 transmits a change command of the handover threshold for the communication terminal 300 to the relay device 210. In S208, the relay device 210 transmits the change command received in S206 to the communication terminal 300.

In S210, the communication terminal 300 changes the handover threshold in accordance with the change command received in S208. In S212, the communication terminal 300 measures the radio wave reception intensity from the relay device 210. In S214, the communication terminal 300 transmits the measurement report to the relay device 210. In S216, the handover process is executed to cause the communication terminal 300 to be handed over. In S218, the relay device 210 switches the relay function off after the handover of the communication terminal 300 has been completed.

Figure 4:
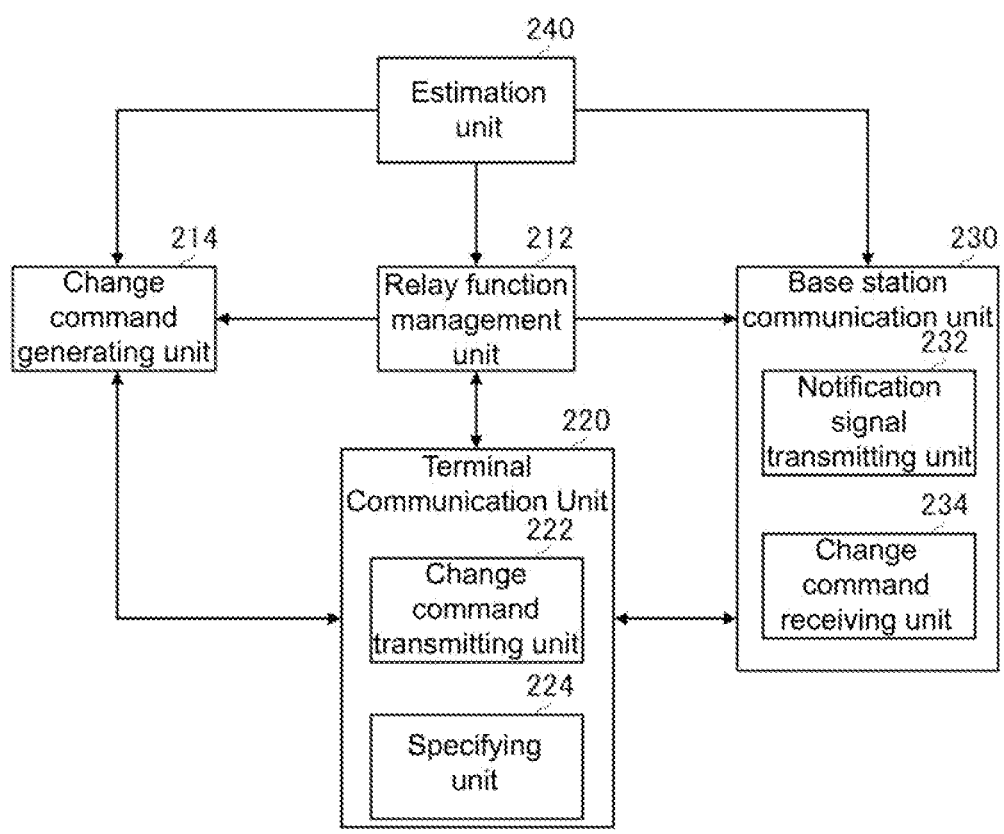
FIG. 4 schematically illustrates an example of a functional configuration of a relay device 210 in accordance with one aspect of the present disclosure.

FIG. 4 schematically illustrates an example of a functional configuration of the relay device 210. The relay device 210 includes a relay function management switch 212, a change command generating unit 214, a terminal communication unit 220, a base station communication unit 230, and an estimation unit 240. Note that it is not essential for the relay device 210 to include all of these configurations.

The relay function management switch 212 manages relay functions for relaying communication between the radio base station 100 and the communication terminal 300. The relay function management switch 212 may switch the relay function on and off.

The relay function management switch 212, for example, switches the relay function on and off according to an operation on the relay device 210. For example, the relay function management switch 212 switches the relay function on and off according to the operation of the occupant of vehicle 200 on which the relay device 210 is mounted. Furthermore, for example, the relay function management switch 212 switches the relay function on and off according to the state of the moving body on which the relay device 210 is mounted.

When the relay device 210 is mounted on a vehicle 200 having an engine, for example, the relay function management switch 212 switches the relay function on when the IG power supply is turned on. The relay function management switch 212 may switch the relay function on when the engine is turned on. The relay function management switch 212 may switch the relay function on when the ACC power supply is turned on. The relay function management switch 212 may switch the relay function off when the IG power supply is switched off. The relay function management switch 212 may switch the relay function off when the engine is switched off. The relay function management switch 212 may switch the relay function off when the ACC power supply is switched off.

When the relay device 210 is mounted in an electric vehicle having an off state, an ACC state, an on state, and a travelable state, for example, the relay function management switch 212 switches the relay function on in the on state. The relay function management switch 212 may switch the relay function on in the travelable state. The relay function management switch 212 may switch the relay function on in the ACC state. The relay function management switch 212 may switch the relay function off when switching from an on state to an ACC state or an off state. The relay function management switch 212 may switch the relay function off when switching from a travelable state to an on state, an ACC state or an off state. The relay function management switch 212 may switch the relay function off when switching an ACC state to an off state.

When the relay device 210 is mounted in an electric vehicle having an off state, a power on state, and a travelable state, the relay function management switch 212 may switch the relay function on in the power on state. The relay function management switch 212 may switch the relay function on in the travelable state. The relay function management switch 212 may switch the relay function off when switching from a power on state to an off state. The relay function management switch 212 may switch the relay function off when switching from a travelable state to a power on state or an off state.

The change command generating unit 214 generates a change command of the handover threshold for the communication terminal 300 located in the relay device 210 when the relay function management switch 212 switches the relay function off.

The terminal communication unit 220 wirelessly communicates with the communication terminal 300. The terminal communication unit 220 includes a change command transmitter 222 and a specifying unit 224. When the relay function management switch 212 switches the relay function off, the change command transmitter 222 transmits the change command of the handover threshold to the communication terminal 300 located in the relay device 210.

The specifying unit 224 specifies a radio frequency band used for wireless communication with the communication terminal 300. The change command of the handover threshold transmitted by the change command transmitter 222 may be a command to change the handover threshold for a radio frequency band specified by the specifying unit 224.

The change command transmitter 222 transmits, for example, the change command generated by the change command generating unit 214 to the communication terminal 300. The change command generating unit 214 may generate a change command of the handover threshold for the radio frequency band specified by the specifying unit 224. The change command may be generated by the radio base station 100.

The base station communication unit 230 wirelessly communicates with the radio base station 100. The base station communication unit 230 may include a notification signal transmitter 232 and a change command receiver 234. When the relay function management switch 212 switches the relay function off, the notification signal transmitter 232 transmits a notification signal notifying to switch the relay function off to the radio base station 100. The notification signal transmitter 232 may transmit the radio frequency band specified by the specifying unit 224 together with the notification signal to the radio base station 100.

The change command receiver 234 receives the change command of the handover threshold for the communication terminal 300 generated and transmitted by the radio base station 100 according to the notification signal transmitted by the notification signal transmitter 232. The change command receiver 234 may receive, according to the notification signal transmitted by the notification signal transmitter 232 and the radio frequency band, a change command of the handover threshold for the radio frequency band specified by the specifying unit 224 with respect to the communication terminal 300 generated and transmitted by the radio base station 100. Furthermore, the change command may be generated by other devices provided outside the relay device 210. For example, the change command may be generated by the MME 22. The change command receiver 234 may receive the change command generated by the MME 22. The change command transmitter 222 may transmit the change command received by the change command receiver 234 to the communication terminal 300.

The change command transmitter 222 may transmit, to the communication terminal 300, a change command for increasing the handover threshold to a predetermined value. The change command transmitter 222 may transmit, to the communication terminal 300, a change command for increasing the handover threshold by a predetermined value.

The relay function management switch 212 may switch the relay function off after the change command transmitter 222 has transmitted the change command to the communication terminal 300 and after the communication terminal 300 is handed over from the relay device 210. The relay function management switch 212 may switch the relay function off after the change command transmitter 222 has transmitted the change command to the communication terminal 300 and after all of the communication terminals 300 located in the relay device 210 are handed over from the relay device 210.

The estimation unit 240 monitors the state of the moving body on which relay device 210 is mounted while the relay function is switched on, and estimates that the relay function will be switched off. The estimation unit 240 estimates that the relay function will be switched off when, for example, the moving speed of the moving body satisfies a predetermined condition. Furthermore, the estimation unit 240 estimates that the relay function will be switched off when, for example, the moving speed of the moving body is slower than a predetermined speed.

For example, if the relay device 210 is mounted on the vehicle 200, the estimation unit 240 estimates that the relay function will be switched off when the traveling speed of the vehicle 200 satisfies a predetermined condition. The estimation unit 240, for example, monitors the change in traveling speed of the vehicle 200, and estimates that the relay function will be switched off when the probability that the vehicle 200 is parked is determined to be high. The relationship between the change in the traveling speed and whether or not the vehicle 200 is parked is derived, for example, by executing machine learning on a number of data indicating the change in the traveling speed and whether or not the vehicle 200 has been parked.

Furthermore, the estimation unit 240 estimates that the relay function will be switched off when, for example, the traveling speed of the vehicle 200 is slower than a predetermined speed. When the traveling speed of the vehicle 200 is slower than the predetermined speed, it may be said the probability that the vehicle 200 is parked as is and the engine and the power supply are switched off is high, and the possibility that the relay function will be switched off is high.

When the power off operation of the moving body is detected, the estimation unit 240 estimates that the relay function will be switched off. In this case, the moving body may be configured to, for example, turn off the power supply after the communication terminal 300 located in the relay device 210 is handed over when the power off operation is performed.

When the relay device 210 is mounted on the vehicle 200, the estimation unit 240 may estimate that the relay function will be switched off when an ignition off operation of the vehicle 200 is detected. Furthermore, when the engine off operation of the vehicle 200 is detected, the estimation unit 240 may estimate that the relay function will be switched off.

In response to the estimation unit 240 estimating that the relay function will be switched off, the change command transmitter 222 may transmit the change command to the communication terminal 300. For example, in response to the estimation unit 240 estimating that the relay function will be switched off, the change command generating unit 214 generates the change command, and the change command transmitter 222 transmits the change command generated by the change command generating unit 214 to the communication terminal 300. For example, in response to the estimation unit 240 estimating that the relay function will be switched off, the notification signal transmitter 232 transmits a notification signal to the radio base station 100, and the change command transmitter 222 transmits, to the communication terminal 300, the change command received by the change command receiver 234 from the radio base station 100.

In FIG. 4, an example is illustrated in which the relay device 210 includes the specifying unit 224, however, the figures and description are not meant to be limiting. The specifying unit 224 may be arranged in another device provided outside the relay device 210. For example, the specifying unit 224 may be arranged in the radio base station 100. Furthermore, the specifying unit 224 may be disposed in the MME 22.

Figure 5:
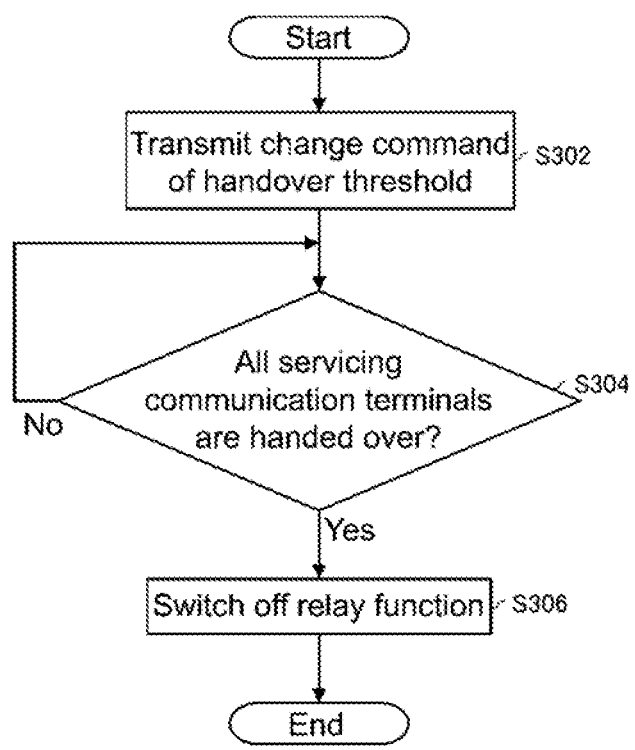
FIG. 5 schematically illustrates an example of the flow of processes by the relay device 210 in accordance with one aspect of the present disclosure.

FIG. 5 schematically illustrates an example of the flow of processes by the relay device 210. Here, a flow of processes of the relay device 210 when the relay function is switched from on to off by the relay function management switch 212 is shown.

In S302, the change command transmitter 222 transmits a change command of the handover threshold to all the communication terminals 300 located in the relay device 210. The change command transmitter 222 may transmit, to each of the plurality of communication terminals 300, a change command of the handover threshold for a radio frequency band used for wireless communication with each of the plurality of communication terminals 300 specified by the specifying unit 224.

In S304, the relay function management switch 212 determines whether all communication terminals 300 located in the relay device 210 are handed over from the relay device 210. When determined that they are handed over, the process proceeds to S306. In S306, the relay function management switch 212 switches the relay function off. The process is then terminated.

Figure 6:
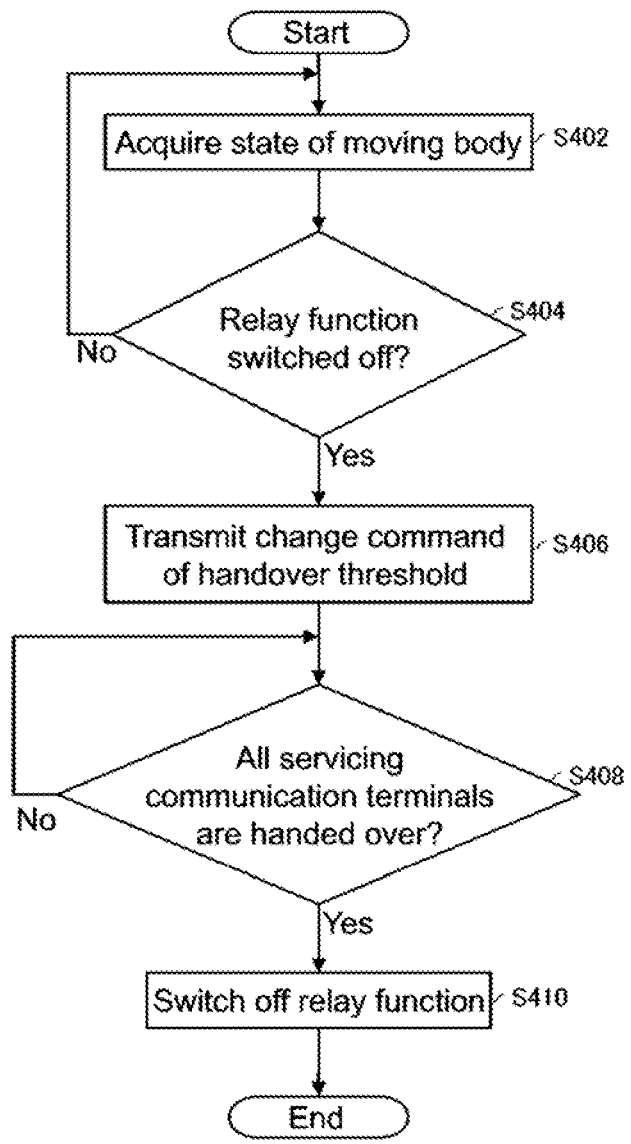
FIG. 6 schematically illustrates an example of the flow of processes by the relay device 210 in accordance with one aspect of the present disclosure.

FIG. 6 schematically illustrates an example of the flow of processes by the relay device 210. Here, a state in which the estimation unit 240 monitors the state of the moving body on which the relay device 210 is mounted will be described as the starting state.

In S402, the estimation unit 240 acquires the state of the moving body on which the relay device 210 is mounted. In S404, the estimation unit 240 determines whether or not the relay function will be switched off based on the state of the moving body acquired in S402. The estimation unit 240 determines that the relay function will be switched off when, for example, the moving speed of the moving body satisfies a predetermined condition. When determined that the relay function will be switched off, the process proceeds to S406, and when not determined that the relay function will be switched off, the process returns to S402.

In S406, the change command transmitter 222 transmits a change command of the handover threshold to all the communication terminals 300 located in the relay device 210. The change command transmitter 222 may transmit, to each of the plurality of communication terminals 300, a change command of the handover threshold for a radio frequency band used for wireless communication with each of the plurality of communication terminals 300 specified by the specifying unit 224.

In S408, the relay function management switch 212 determines whether all communication terminals 300 located in the relay device 210 are handed over from the relay device 210. When it is determined that the communication terminals 300 have been handed over, the process proceeds to S410. In S410, the relay function management switch 212 switches the relay function off. The process is then terminated.

Figure 7:
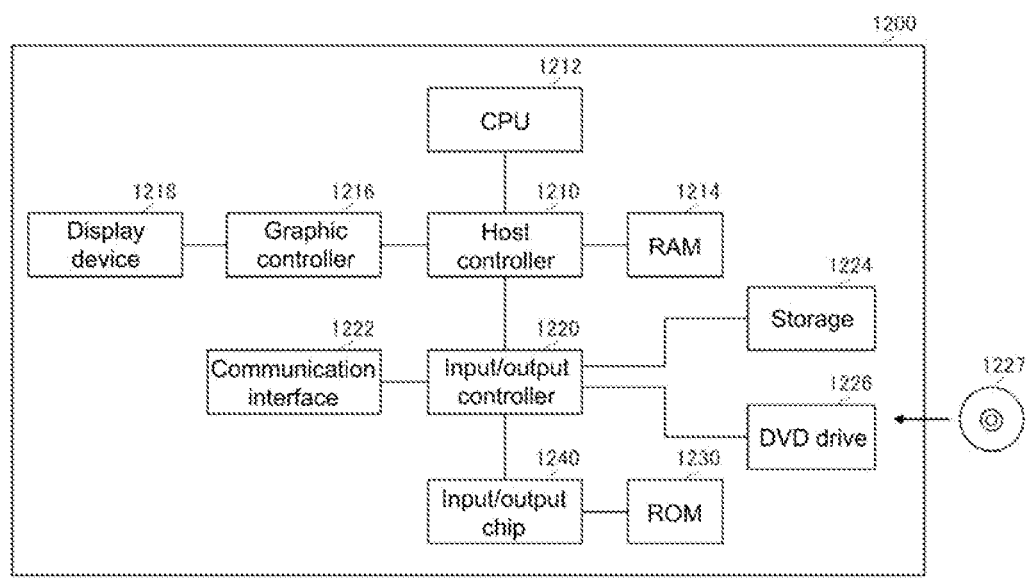
FIG. 7 schematically illustrates an example of a hardware configuration of a computer 1200 that functions as the relay device 210 in accordance with one aspect of the present disclosure.

FIG. 7 schematically illustrates an example of a hardware configuration of a computer 1200 that functions as the relay device 210. A program, or set of instructions, installed on the computer 1200 may cause the computer 1200 to function as one or more "units" or "parts" of the device according to the embodiment described above, or cause the computer 1200 to execute the operation associated with the device or the one or more "units" or "parts" of the device according to the embodiment described above, and/or cause the computer 1200 to execute the process or stages of the process according to the embodiment described above. Such a program may be executed by the CPU 1212 to cause the computer 1200 to execute specific operations associated with some or all of the blocks in the flowchart and the block diagram described in the specification.

The computer 1200 according to the present embodiment includes a CPU 1212, a RAM 1214, and a graphic controller 1216, which are connected to each other by a host controller 1210. The computer 1200 also includes a communication interface 1222, a storage 1224, a DVD drive 1226, and an input/output unit, such as an IC card drive, which are connected to the host controller 1210 via an input/output controller 1220. The DVD drive 1226 may be a DVD-ROM drive, a DVD-RAM drive, or the like. The storage 1224 may be a hard disk drive, a solid-state drive, or the like. The computer 1200 also includes a legacy input/output unit such as a ROM 1230 and a touch panel, which are connected to the input/output controller 1220 via an input/output chip 1240.

The CPU 1212 operates according to the program stored in the ROM 1230 and the RAM 1214, thereby controlling each unit. The graphic controller 1216 obtains image data generated by the CPU 1212 in a frame buffer or the like provided in the RAM 1214 or itself, so that the image data is displayed on the display device 1218. The computer 1200 may not include the display device 1218, in which case the graphic controller 1216 causes the image data to be displayed on an external display device.

The communication interface 1222 communicates with other electronic devices through a wireless communication network. The storage 1224 stores programs and data used by the CPU 1212 in the computer 1200. The DVD drive 1226 reads the program or data from the DVD-ROM 1227 or the like and provides the program or data to the storage 1224. The IC card drive reads programs and data from the IC card and/or writes programs and data to the IC card.

The ROM 1230 stores therein programs and the like executed by the computer 1200 at the time of activation and/or programs dependent on the hardware of the computer 1200. The input/output chip 1240 may also connect various input/output units to the input/output controller 1220 through the USB port and the like.

The program is provided by a computer-readable storage medium, such as the DVD-ROM 1227 or an IC card. The program is read from a computer-readable storage medium, installed on the storage 1224, RAM 1214, or ROM 1230, which is also an example of a computer-readable storage medium, and executed by the CPU 1212. The information processing described in these programs is read by the computer 1200, resulting in coordination between the program and the various types of hardware resources described above. The device or method may be configured by realizing an operation or processing of information according to the use of the computer 1200.

For example, if communication is performed between the computer 1200 and the external device, the CPU 1212 may execute a communication program loaded in the RAM 1214 and instruct the communication interface 1222 to perform the communication process based on the processing to described in the communication program. The communication interface 1222 reads the transmission data stored in a transmission buffer region provided in a recording medium such as RAM 1214, storage 1224, DVD-ROM 1227, or IC card under the control of the CPU 1212, and transmits the read transmission data to the network or writes the received data received from the network to a receiving buffer region or the like provided on the recording medium.

The CPU 1212 may also cause all or necessary portions of a file or database stored in an external recording medium, such as a storage 1224, a DVD drive 1226 (DVD-ROM 1227), an IC card, or the like to be read to the RAM 1214, and execute various types of processing on the data on the RAM 1214. The CPU 1212 may then write back the processed data to an external recording medium.

Various types of information, such as various types of programs, data, tables, and databases, may be stored in a recording medium and subjected to information processing. The CPU 1212 may execute various types of processing described throughout the present disclosure and including various types of operations specified by the command sequence of a program, information processing, condition determination, conditional branching, unconditional branching, information search/replacement and the like on the data read from the RAM 1214, and may write back the result to the RAM 1214. Furthermore, the CPU 1212 may search for information in a file, a database, or the like in the recording medium. For example, if a plurality of entries, each of which has an attribute value of a first attribute associated with an attribute value of a second attribute, are stored in a recording medium, the CPU 1212 may search for an entry that matches a condition in which the attribute value of the first attribute is designated from the plurality of entries, and read the attribute value of the second attribute stored in the relevant entry, thus acquiring the attribute value of the second attribute associated with the first attribute that satisfies the predetermined condition.

The program or software module described above may be stored on a computer 1200 or in a computer-readable storage medium near the computer 1200. A recording medium, such as a hard disk or RAM, provided in a service system connected to a dedicated communication network or the Internet, may be used as a computer-readable storage medium, thereby providing the program to the computer 1200 over a network.

The blocks in the flowchart and the block diagram in the embodiment described above may represent the "parts" of the device responsible for performing the stages or operations of the process in which the operation is performed. A specific stage and "unit or "part" may be implemented by a dedicated circuitry, programmable circuit provided with a computer-readable command stored on a computer-readable storage medium, and/or processor provided with a computer-readable command stored on a computer-readable storage medium. The dedicated circuitry may include digital and/or analog hardware circuit and may include integrated circuit (IC) and/or discrete circuit. The programmable circuit may include, for example, a reconfigurable hardware circuit including AND, OR, exclusive OR, not AND, not OR, and other logical operations, flip-flops, registers, as well as memory elements such as a field programmable gate array (FPGAs), programmable logic array (PLA), and the like.

The computer-readable storage medium may include any tangible device capable of storing commands executed by an appropriate device, and as a result, the computer-readable storage medium having commands stored thereon is equipped with a product including a command that may be executed to create a means for performing operations designated in the flowchart or the block diagram. Examples of the computer-readable storage medium may include an electronic storage medium, magnetic storage medium, optical storage medium, electromagnetic storage medium, semiconductor storage medium, and the like. A more specific example of the computer-readable storage medium may include a floppy (registered trademark) disk, diskette, hard disk, random access memory (RAM), read-only memory (ROM), erasable programmable read-only memory (EPROM or flash memory), electrically erasable programmable read-only memory (EEPROM), static random access memory (SRAM), compact disk read-only memory (CD-ROM), digital versatile disks (DVD), Blu-Ray (registered trademark) disk, memory stick, integrated circuit card, and the like.

The computer-readable command may include either a source code or an object code described with an arbitrary combination of one or more programming languages including object oriented programming language such as assembly commands, command set architecture (ISA) commands, machine commands, machine dependent commands, microcode, firmware commands, status setting data, or Smalltalk, Java (registered trademark), C++, and the like, and a known procedural programming language such as a "C" programming language or similar programming language.

The computer-readable command may be provided to a processor of a general-purpose computer, special purpose computer, or other programmable data processing device or a programmable circuit through local or local area network (LAN) or wide area network (WAN) such as the Internet so that a processor of a general purpose computer, special purpose computer, or other programmable data processing device or a programmable circuit may execute the computer-readable command to generate means for performing the operations designated in the flowchart or the block diagram. An example of a processor includes a computer processor, processing unit, microprocessor, digital signal processor, controller, micro-controller, or the like.

While embodiments have been described, the technical scope is not limited to the scope described in the above embodiments. It will be apparent to those skilled in the art that various modifications or improvements may be made to the embodiments described above. It is apparent from the description of the claims that such modified or improved forms may also be encompassed within the technical scope of the embodiments presented.

It should be noted that the order of execution of each process, such as operations, procedures, steps, and stages in the device, system, program, and method set forth in the claims, specification, and drawings are not specifically designated as "before," "prior to," and the like, and may be implemented in any order unless the output of the previous process is used in the subsequent process. For the operation flow in the claims, specification, and drawings, even if the operation flow is described using "first", "next", and the like for the sake of convenience, this does not mean that it is necessary to perform the operation flow in this order.

What is claimed is:

1. A relay device for relaying communication between a radio base station and a communication terminal, the relay device comprising:
   a relay function management switch that switches on and off a relay function for relaying communication between the radio base station and the communication terminal; and a change command transmitter that transmits, to the communication terminal, a change command of a handover threshold for the communication terminal establishing a wireless communication connection with the relay device when the relay function management switch switches the relay function off.

2. The relay device according to claim 1, wherein the change command of the handover threshold is a command for changing a handover threshold for a radio frequency band used in a wireless communication with the communication terminal.

3. The relay device according to claim 2, further comprising a specifying unit that specifies a radio frequency band used for wireless communication with the communication terminal;
wherein the change command transmitter transmits, to the communication terminal, a change command of a handover threshold for the radio frequency band specified by the specifying unit.

4. The relay device according to claim 1, wherein when the relay function management switch switches the relay function off, the change command transmitter transmits, to the radio base station, a notification signal notifying to switch the relay function off, receive the change command transmitted by the radio base station, and transmit the change command to the communication terminal.

5. The relay device according to claim 1, further comprising a change command generating unit that generates the change command when the relay function management switch switches the relay function off;
wherein the change command transmitter transmits the change command generated by the change command generating unit to the communication terminal.

6. The relay device according to claim 1, wherein the change command transmitter transmits, to the communication terminal, the change command for increasing the handover threshold for determining whether a radio wave reception intensity from a serving cell is lower than the handover threshold.

7. The relay device according to claim 6, wherein the change command transmitter transmits the change command for increasing the handover threshold to a predetermined value to the communication terminal.

8. The relay device according to claim 6, wherein the change command transmitter transmits the change command for increasing the handover threshold by a predetermined value to the communication terminal.

9. The relay device according to claim 1, wherein the change command transmitter transmits the change command to the communication terminal before the relay function management switch switches the relay function off.

10. The relay device according to claim 1, wherein the relay function management switch switches the relay function off after the change command transmitter has transmitted the change command to the communication terminal and the communication terminal is handed over from the relay device.

11. The relay device according to claim 10, wherein the relay function management switch switches the relay function off after all of the communication terminals establishing a wireless communication connection with the relay device are handed over from the relay device.

12. The relay device according to claim 1, wherein the relay device is mounted on a moving body.

13. The relay device according to claim 12, further comprising an estimation unit that monitors a state of the moving body while the relay function is switched on and estimates that the relay function will be switched off;
wherein the change command transmitter transmits the change command to the communication terminal in response to an estimation unit estimating that the relay function will be switched off.

14. The relay device according to claim 13, wherein the estimation unit estimates that the relay function will be switched off when a moving speed of the moving body satisfies a predetermined condition.

15. The relay device according to claim 13, wherein the estimation unit estimates that the relay function will be switched off when a moving speed of the moving body is slower than a predetermined speed.

16. The relay device according to claim 13, wherein the estimation unit estimates that the relay function will be switched off when a power off operation of the moving body is detected.

17. The relay device according to claim 13, wherein:
the moving body is a vehicle, and
the estimation unit estimates that the relay function will be switched off when an ignition off operation of the vehicle is detected.

18. A non-transitory machine-readable storage medium comprising instructions, which when implemented by one or more machines, causes the one or more machines to perform operations comprising:
switching on and off a relay function for relaying communication between a radio base station and a communication terminal; and
transmitting, to the communication terminal, a change command of a handover threshold for the communication terminal establishing a wireless communication connection with a relay device when a relay function management switch switches the relay function off.

19. The non-transitory machine-readable storage medium comprising instructions of claim 18, which when implemented by one or more machines, causes the one or more machines to perform further operations comprising:
transmitting, to the communication terminal, a change command of a handover threshold for a radio frequency band specified by a specifying unit.

20. A communication system comprising a relay device for relaying communication between a radio base station and a communication terminal, the communication system comprising:
a relay function management switch that switches on and off a relay function for relaying communication between the radio base station and the communication terminal of the relay device; and
a change command transmitter that transmits, to the communication terminal, a change command of a handover threshold for the communication terminal establishing a wireless communication connection with the relay device when the relay function management switch switches the relay function off.

21. The communication system according to claim 20, further comprising a specifying unit that specifies a radio frequency band used for wireless communication with the communication terminal by the relay device;
wherein the change command transmitter transmits, to the communication terminal, a change command of a handover threshold for the radio frequency band specified by the specifying unit.

22. A computer-implemented method comprising a change command transmitting stage of transmitting, to a communication terminal, a change command of a handover threshold for the communication terminal establishing a wireless communication connection with a relay device when switching from on to off the relay function of the relay device for relaying communication between the radio base station and the communication terminal.

23. The communication method according to claim 22, further comprising a specifying stage of specifying a radio frequency band used for wireless communication with the communication terminal by the relay device;

wherein the change command transmitting stage includes transmitting, to the communication terminal, a change command of a handover threshold for the radio frequency band specified in the specifying stage.

\* \* \* \* \*